H. H. ROOT.
CENTRIFUGAL HONEY EXTRACTOR.
APPLICATION FILED APR. 6, 1914.

1,363,999.

Patented Dec. 28, 1920.

UNITED STATES PATENT OFFICE.

HUBER H. ROOT, OF MEDINA, OHIO, ASSIGNOR TO A. I. ROOT COMPANY, OF MEDINA, OHIO.

CENTRIFUGAL HONEY-EXTRACTOR.

1,363,999.  Specification of Letters Patent.  Patented Dec. 28, 1920.

Application filed April 6, 1914. Serial No. 829,876.

*To all whom it may concern:*

Be it known that I, HUBER H. ROOT, of Medina, in the county of Medina and in the State of Ohio, have invented certain new and useful Improvements in Centrifugal Honey-Extractors, and do hereby declare that the following is a full, clear, and exact description thereof.

My invention relates to centrifugal honey extractors, such as those of the type shown in Patent No. 1,089,065, March 3, 1914, issued to my assignee, the A. I. Root Company, and the object of my invention is to improve the construction thereof in particulars which experience has shown improvement is important, and to this end my invention consists in the honey extractor constructed substantially as hereinafter specified and claimed.

The honey extractor which embodies the invention of said Patent No. 1,089,065, is one where the rotary comb holding baskets are revolved by toothed bevel gearing, and in the accompanying drawings I show a similar construction with the important exception that instead of toothed gearing friction gearing is employed, and in the drawings—

Figure 1:
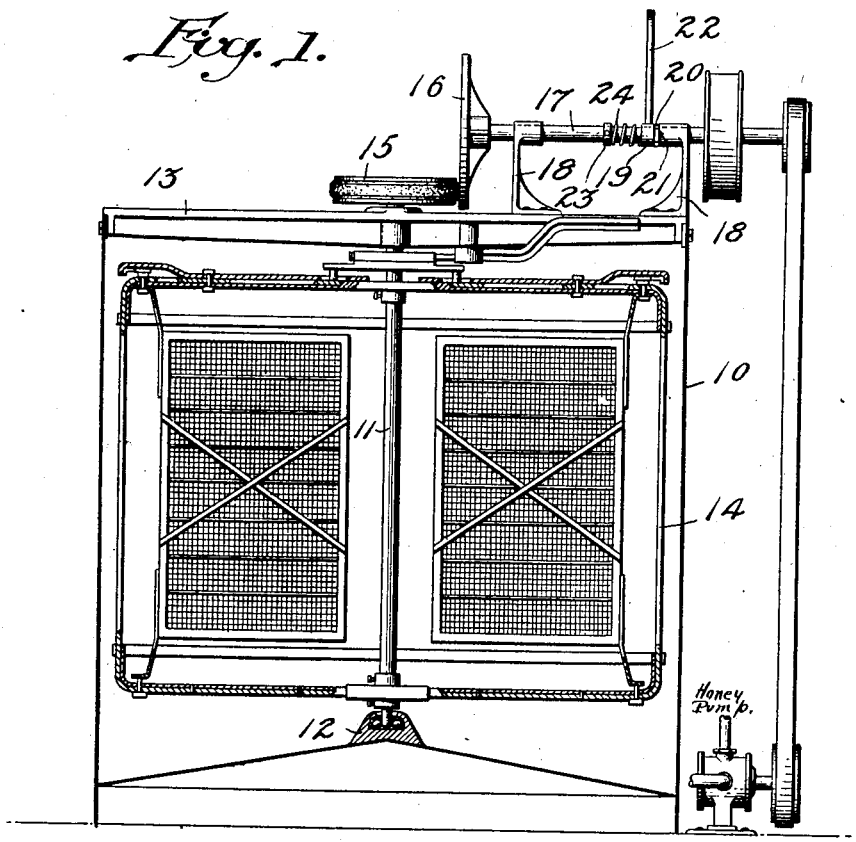
Figure 1 is a vertical section with parts in side elevation of such a honey extractor embodying my invention.
Figure 2:
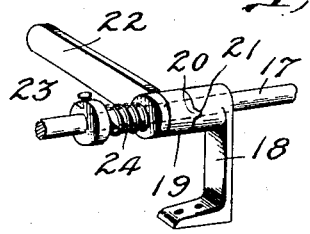
Fig. 2 is a detail view in perspective of the clutch mechanism.

Describing in detail the extractor shown in the drawing, it comprises a cylindrical casing or tank 10 having at its center a vertical shaft 11 supported at its lower end in a step bearing 12 and at its upper end passing through and journaled in a cross bar 13 that extends diametrically across the tank 10 at the top and the shaft, as usual, having a frame 14 to which comb-holding baskets are pivotally hung so that by the rapid revolution of the frame the baskets are revolved and by centrifugal force the honey is expelled from the cell of the honey comb. Above the cross bar 13 the shaft has fixed to it a friction wheel 15 whose periphery is formed of some friction-producing material, such, for example, as tar paper, and adapted to engage such periphery and impart motion to the wheel. The shaft has a friction disk 16, preferably, but not necessarily, of cast iron which is secured to one end of a horizontal driving shaft 17 that is mounted in bearings in brackets 18 bolted to the cross bar 13. The driving shaft is longitudinally movable, as in the case of the machine of the patent above mentioned, so that the driving power can at will be applied to, or disconnected from the shaft 11, and the shaft sliding means is similar to that of said patent, it comprising a ring 19 that is loose on the shaft which is contiguous to one of the shaft bearings and on its side next to the latter, has one or more ratchet-form projections 20, or cams adapted to coöperate with correspondingly shaped notches 21 in the end of said bearing so that by rotating the ring, as by means of a radial handle 22, the ring is cammed, or crowded axially. Fixed to the shaft on the side of the ring opposite that having the cam, is a collar 23, between which and the adjacent side of the ring is a short coil spring 24 through which the axial movement of the ring is yieldingly transmitted to the collar and from the latter to the shaft so that the shaft is moved in the direction to press the friction driving disk 16 against the periphery of the friction wheel 15. No spring is required to throw the shaft in the opposite direction, as in the case of the before-mentioned patent, because as soon as the pressure of the driving disk upon the driven wheel is released, as by turning the ring 19 to enable its cam projections to enter the cam notches in the bearing, the driving disk will cease to impart motion to the friction wheel. By the interposition of the spring, or yielding device between the cam-carrying ring and the shaft collar, the pressure of the driving disk upon the wheel is gradually applied so that the starting up of the honey comb-carrying-frame, or reel, is easier and without any shock or violence, as may result from the employment of toothed gearing and the speeding up is gradual. This is a matter of considerable importance because by reason of the delicate, or fragile character of the honey combs, too sudden an application of driving power and too rapid an increase of speed is apt to break the same. In practice with the toothed bevel gearing it has been sought to obviate this trouble in power driven extractors by the employment of a belt tightening pulley, or idler applied to the driving belt running to the belt pulley on the driving shaft, but this has been found objectionable because the operation of the idler calls for considerable strength on the part of the operator and some degree of skill, or experience in gradually tightening the belt so as to avoid too violent or rapid speeding up of the reel. By my invention this idler is eliminated so that the construction is simplified in regard to the matter of mechanism employed and the personal equation in speeding up is eliminated and in effect the speeding up is automatically done and is certain to be always properly done, for with the spring-engaged collar 23 initially placed in that position on the shaft to give the pressure required to produce the desired friction, the operation of speeding up is entirely mechanical since it involves merely the turning of the cam-carrying ring. Any adjustment of the collar to compensate for wear of the friction wheel periphery is only occasionally required, such, for example, not oftener than once in two seasons.

A very important advantage in eliminating the idler and continuously running the driving shaft even when the reel is not being driven, is that it is usual to provide honey extractors with a honey pump that is belted to a pulley on the driving shaft. With the construction of the patent before-mentioned which involves the use of the idler, the honey pump is not operated when the reel is not revolved, so that the honey pump being run periodically, must, when at work, operate faster. By running the honey pump continuously, which is possible with a continuously revolved driving shaft, the honey pump may be run at a slower speed, and hence, with less strain on the pump belt and on the pump bearings.

The elimination of the belt tightener, or idler, due to the elimination of the toothed gearing, renders more convenient the location of the engine in the honey house because such location does not have to be suited to the requirements of the idler, and honey houses are usually so crowded that there is not much choice of location; and again the idler involves great wear upon the belt, strain on the outer bearing of the driving shaft and the imposition of exceptional load on the engine in starting up so that by eliminating the idler I prolong the wear of the belt, save strain and wear on the shaft bearing, and load on the engine. The employment of the friction drive in place of the toothed gearing eliminates the necessity of oiling, the operation is noiseless and the wear is less than in the case of toothed gears.

While I prefer the construction of centrifugal extractor shown in the drawings, because that construction is made by my assignee the A. I. Root Company, yet I do not restrict my invention to use that identical construction of extractor, as the particular construction of the extractor may be varied and yet the benefits or advantages of my invention secured.

Having thus described my invention what I claim is—

1. In gearing for a centrifugal honey extractor, the combination of a shaft, a comb-holding reel carried thereby, a driving shaft having means for connection with a source of power, friction gearing for transmitting motion from the driving shaft to the reel carrying shaft comprising coacting members on the two shafts, and means for disconnecting said members while the revolution of the driving shaft continues and for bringing the friction gearing members into operative relation comprising a device adapted gradually to press one member against the other.

2. In gearing for a centrifugal honey extractor, the combination of a shaft, a comb-holding reel carried thereby, a driving shaft having means for connection with a source of power, friction gearing for transmitting motion from the driving shaft to the reel-carrying shaft comprising coacting members on the two shafts, and means to yieldingly hold said members in contact, comprising a collar fixed to the shaft, a rotary cam loose on the shaft, a stationary part with which said cam coacts, and a spring between the shaft collar and the rotary cam.

3. In gearing for a centrifugal honey extractor, the combination of a vertical shaft, a comb holding reel carried thereby, a horizontal driving shaft, friction gearing for transmitting motion from the driving shaft to the reel-carrying shaft, comprising a wheel on the upper end of the vertical shaft and a wheel on the inner end of the horizontal shaft, means on the outer end of the horizontal shaft for connecting the same with a source of power, means to hold said friction gearing members yieldingly in contact, and means for moving said horizontal shaft longitudinally for disconnecting said members while the revolution of the driving shaft continues.

In testimony that I claim the foregoing I have hereunto set my hand.

HUBER H. ROOT.

Witnesses:
E. R. Root,
L. W. Boyden.